Jan. 29, 1963  T. L. FAWICK  3,075,624
CLUTCH OR BRAKE
Filed July 19, 1960  2 Sheets-Sheet 1

Fig. I

INVENTOR.
THOMAS L. FAWICK
BY
RICHEY, McNENNY & FARRINGTON
William J. Flynn
ATTORNEYS Jan. 29, 1963 T. L. FAWICK 3,075,624
CLUTCH OR BRAKE
Filed July 19, 1960 2 Sheets-Sheet 2

INVENTOR.
THOMAS L. FAWICK
BY
RICHEY, McNENNY & FARRINGTON
William J. Flynn
ATTORNEYS.

United States Patent Office 3,075,624
Patented Jan. 29, 1963

3,075,624
CLUTCH OR BRAKE
Thomas L. Fawick, Shaker Heights, Ohio, assignor to Fawick Corporation, Cleveland, Ohio, a corporation of Michigan
Filed July 19, 1960, Ser. No. 43,784
7 Claims. (Cl. 192—83)

This invention relates generally to fluid-actuated clutches and brakes of the type in which an annular diaphragm or torque bag of rubber-like material is distensible by internal fluid pressure to effect torque-sustaining clutching or braking engagement.

A serious difficulty encountered with clutches or brakes of the type just mentioned, especially when the fluid pressure is supplied by substantially incompressible hydraulic fluid, has been the tendency of the annular diaphragm not to return to its normal non-distended condition when the fluid pressure is relieved. The hydraulic liquid, even after the pressure has been relieved, tends to maintain a back pressure in the annular diaphragm which is not always overcome by the inherent resiliency of the rubber-like material of the diaphragm. Also, in the case of an expanding type annular diaphragm which is rotating, the centrifugal force due to its rotation tends to maintain the diaphragm in its radially outwardly distended condition. Due to these or other factors the diaphragm tends to remain distended and in torque-sustaining relationship with the brake or clutch surface, even when it is desired to disengage these parts.

The present invention is directed to a novel arrangement which effectively solves this difficulty by insuring that the diaphragm will return to its normal, non-distended condition following the relieving of the fluid pressure therein.

Accordingly, it is an object of this invention to provide such an arrangement having novel provision for positively insuring the return of the diaphragm to its normal, non-distended condition when the fluid pressure is relieved, especially where the fluid is hydraulic liquid which tends to oppose such return of the diaphragm.

Another object of this invention is to provide such an arrangement which constitutes a relatively simple and inexpensive modification of a known clutch or brake construction.

Further objects and advantages of this invention will be apparent from the following detailed description of certain presently-preferred embodiments thereof which are illustrated in the accompanying drawings.

Figure 1:
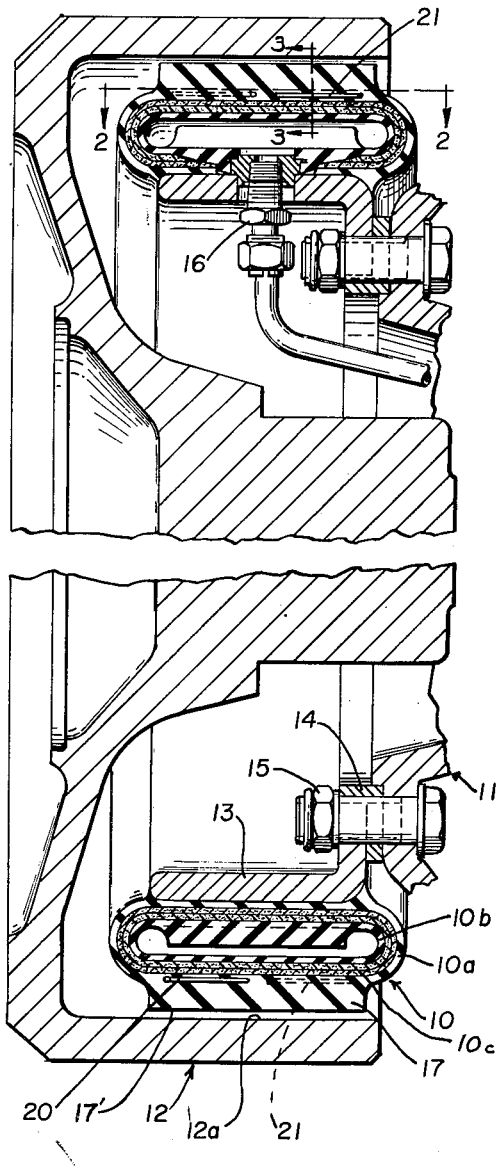
FIG. 1 is an axial section, partly broken away showing a clutch which incorporates the present invention.
Figure 2:
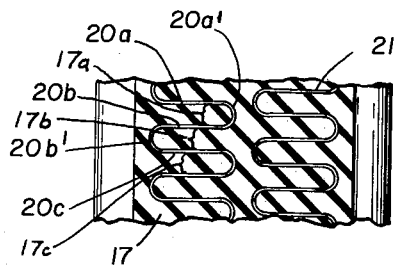
FIG. 2 is a section through the annular diaphragm or torque bag in the FIG. 1 clutch, taken along the line 2—2 in FIG. 1.

Referring first to FIG. 1, the present invention is shown in a clutch of the expanding type in which a fluid-distensible, annular diaphragm or torque bag 10 is adapted to provide clutching engagement between a rotating driving member 11 and a rotatable driven member 12.

The driving member 11 is a hub driven by any suitable motive power source. An annular flanged rim member 13 is mounted on the driving member 11 by means of a flanged adapter ring 14 and a plurality of bolt and nut assemblies 15.

The annular diaphragm or torque bag 10 is made up of an outer member 10a, which at its radially inward side is vulcanized to the rim 13, and an inner tube 10b. The diaphragm or torque bag is of cord-reinforced, vulcanized soft rubber or other suitable elastomeric or rubber-like material having equivalent properties of deformability and resiliency.

One or more inlet-outlet fittings 16 are provided for passing fluid into the interior of the inner tube 10b or for venting the fluid therefrom. This fluid may be compressed air or any suitable hydraulic liquid, for example. When such fluid is injected under pressure into the diaphragm, the diaphragm is distended radially outwardly into clutching engagement with the radially inwardly facing surface 12a of the driven member 12.

As shown in FIG. 1, the diaphragm 10 has an outer wall 17 which is relatively thick, both radially and axially. The outer surface 17a of this wall is substantially flat from side to side, or edgewise. In this particular embodiment the radially outward surface 17a of this outer wall is adapted to frictionally engage the inside of the driven member 12 when the diaphragm is distended. However, it is to be understood that friction wear shoes may be mounted on the outside of the diaphragm for engagement with the driven member 12, if desired.

In accordance with the present invention, the outer wall 17 of the diaphragm has vulcanized therein one or more sinuously coiled metal springs for the purpose of insuring the self-return, radially inward constriction of the diaphragm when the fluid pressure inside the diaphragm is relieved.

Figure 4:
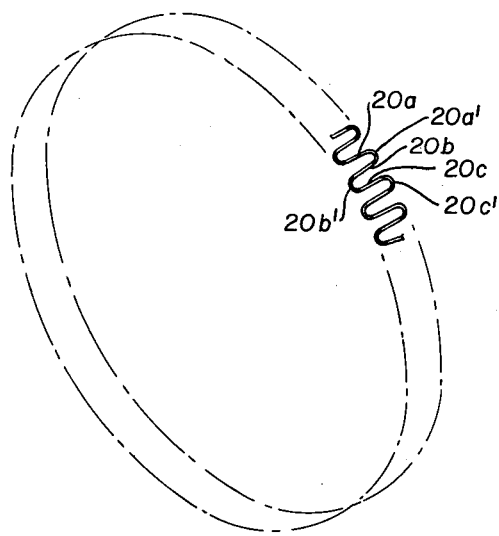
FIG. 4 is a perspective view of the sinuous spring which is vulcanized in the annular diaphragm or torque bag, in accordance with the present invention.

As shown in FIGS. 1–4, there are two such annular spring metal wires 20 and 21 of sinuous configuration embedded in the outer wall 17 of the diaphragm and spaced apart axially therein. As best seen in FIG. 4, the spring 20 is an annulus, viewed endwise, which provides a plurality of circumferentially spaced, elongated straight segments 20a, 20b, 20c, etc., which are interconnected by rounded ends 20a', 20b', 20c', etc., located in alternate sequence at the opposite axial ends of the spring. The elongated straight segments 20a, 20b, 20c, etc., of the spring extend parallel to the axis of the clutch, while the rounded ends 20a', 20b', 20c', etc., extend generally circumferentially of the clutch. The opposite ends of the spring are joined to each other. Thus the complete spring extends lengthwise in a sinuous path annularly around the axis of the diaphragm or torque bag. As shown in FIG. 1, each spring is positioned as close as possible to the cord reinforcement 10c at the radially inward side of the diaphragm outer wall 17.

The other spring 21 is identical to spring 20 and is spaced a short distance axially therefrom in the outer wall 17 of the diaphragm, as shown in FIG. 1.

Preferably, the two springs 20 and 21 together extend through the major portion of the axial length of the outer wall of the diaphragm.

Figure 3:
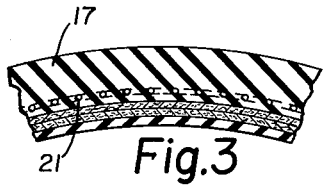
FIG. 3 is a section taken along the line 3—3 in FIG. 2.

As shown in FIG. 3, each spring is of a round cross-section wire.

Each spring is vulcanized in the outer wall 17 of the diaphragm so as to be intimately and firmly surface-bonded throughout its length to the rubber-like material of this diaphragm wall.

As already pointed out, each of the straight spring elements 20a, 20b, 20c, etc., extends parallel to the axis of the diaphragm, while the rounded ends 20a', 20b', 20c', etc., extend generally circumferentially. The straight elements of each spring separate the portions of the rubber which are disposed inside successive loops of that spring. That is, the rubber-like material of the outer wall 17 of the diaphragm is divided by these straight elements of the springs into successive portions 17a, 17b, 17c, etc., (FIG. 2) of relatively short circumferential extent. It has been found that this construction greatly enhances the spring back, or self-return action, of the diaphragm from its outwardly distended condition in response to the relief of the fluid pressure inside the diaphragm.

It is believed that this greatly improved spring back action is explainable as follows:

When the diaphragm is inflated, this tends to cause the sinuous springs 20 and 21 to move outward radially by stretching lengthwise (i.e., in a direction circumferentially of the clutch). These springs tend to resist the force tending to stretch them. Consequently, they tend to restrain the immediately adjoining, circumferentially short portions 17a, 17b, 17c, etc., of the rubber-like material of the diaphragm outer wall 17 which are trapped between their successive straight segments 20a, 20b, 20c, against outward radial movement. Consequently, the radially outward deformation which takes place in these portions of the diaphragm outer wall 17, when the diaphragm is inflated, tends to stress them more than would be the case in the absence of the springs 20 and 21.

Rubber or rubber-like material tends to spring back to its normal, undistorted condition with a force proportional to the amount it is stretched. Since most of the circumferential deformation or stretching which takes place in the diaphragm outer wall 17 occurs in the circumferentially short portions 17a, 17b, 17c, etc., of rubber-like material, the stretching of these portions is much greater, percentage-wise, than would be the case if the rubber-like material of the diaphragm outer wall were continuous and uninterrupted. Therefore, the spring back force of the diaphragm outer wall 17 is proportionately greater.

This characteristic is extremely advantageous where the actuating fluid for the diaphragm is a relatively incompressible hydraulic liquid. In such case, the liquid tends to maintain an internal pressure in the diaphragm which opposes the immediate return of the diaphragm to its non-distended condition.

Also, in the case of a continuously rotating annular diaphragm or torque bag of the radially expanding type, as shown in FIG. 1, the centrifugal force on the diaphragm due to its rotation tends to maintain it distended after the internal fluid pressure has been relieved.

Even where both of these factors are present, the novel construction of the present invention insures the prompt return of the diaphragm to its non-distended condition, because of the enhanced spring-back action of the outer wall of the diaphragm.

Figure 5:
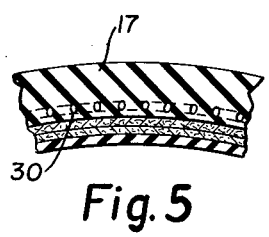
FIG. 5 is a view similar to FIG. 3 and showing an alternative embodiment in which the sinous spring wire is oblong in cross-section.
Figure 6:
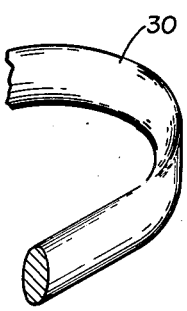
FIG. 6 is an enlarged fragmentary perspective view of the spring wire in the embodiment shown in FIG. 5.

FIGS. 5 and 6 illustrate an alternative embodiment in which the spring wire 30, which is vulcanized in the outer wall 17 of the diaphragm, is oblong in cross-section, rather than round. The major cross-sectional dimension of the spring wire extends substantially radially with respect to the annular diaphragm. With this arrangement, a greater radial thickness of rubber-like material is trapped between adjacent straight elements of each sinuous spring wire. This further improves the spring back action of the diaphragm.

While the invention has been illustrated as applied to a radially expanding clutch, it is applicable also to brakes of this type, as well as to clutches or brakes of the inwardly constricting type, and to other structures in which an improved self-return of the diaphragm is desired.

Therefore, it is to be understood that, while there have been described in detail herein and illustrated in the accompanying drawings certain presently-preferred embodiments of this invention, various modifications, omissions and refinements which depart from the disclosed embodiments may be adopted without departing from the spirit and scope of this invention.

What is claimed is:

1. A tire-like hollow annular body having an annular outer wall of cord and rubber-like material which has an outer surface that is substantially flat from side to side, means for passing pressure fluid into and out of the interior of said body, and a sinuous continuous wire embedded in said outer wall close to the cord and extending continuously around substantially the complete circumference of said outer wall substantially parallel to said outer surface.

2. A brake or clutch comprising two relatively rotatable structures adapted for torque-sustaining frictional engagement with each other and arranged one radially inside the other, one of said structures comprising a hollow fluid-distensible resilient annular diaphragm having an annular torque-sustaining wall of rubber-like material which is positioned to be forced radially toward the other of said structures by internal fluid pressure in the diaphragm, and a sinuous metal spring extending continuously throughout substantially the complete circumferential extent of said annular torque-sustaining wall, said spring throughout its extent being embedded in and bonded to said rubber-like material of said torque-sustaining wall.

3. An assembly comprising outer and inner relatively rotatable structures adapted for torque-sustaining frictional engagement with each other, the outer structure extending circumferentially around the inner structure and the inner structure comprising a hollow fluid-distensible annular diaphragm of rubber-like material having an annular outer wall adapted to be distended radially outwardly by internal fluid pressure in the diaphragm to effect said frictional engagement, and an endless annulus of spring metal vulcanized in said outer wall of the diaphragm and extending lengthwise therein in a sinuous path continuously around the complete circumferential extent of said outer wall annularly about the axis of the diaphragm.

4. The assembly of claim 3 wherein said annulus presents a plurality of elongated, circumferentially spaced, straight segments which extend parallel to the axis of the diaphragm, and a plurality of rounded end segments disposed in alternating sequence at the opposite axial ends of said annulus and interconnecting said straight segments.

5. The assembly of claim 4 wherein said annulus is of round cross-section wire.

6. The assembly of claim 4 wherein said annulus is of oblong cross-section wire having its major cross-sectional dimension disposed radially of the diaphragm.

7. A hollow fluid-distensible annular body of rubber-like material having an annular outer wall with a cord reinforcement therein, said outer wall being thick radially outward from said cord reinforcement and having an outer surface which is substantially flat edgewise, and an annulus of spring metal embedded in and bonded to the rubber-like material of said outer wall close to said cord reinforcement at a location radially outward therefrom, said annulus extending lengthwise in a sinuous path substantially parallel to the outer surface of said outer wall continuously around the entire annular extent of said outer wall.

References Cited in the file of this patent

UNITED STATES PATENTS

| | | |
|---|---|---|
| 2,193,481 | Fawick | Mar. 12, 1940 |
| 2,901,075 | Kiekhaefer | Aug. 25, 1959 |

FOREIGN PATENTS

| | | |
|---|---|---|
| 359,917 | Great Britain | Apr. 25, 1930 |